(12) United States Patent
Zigmont

(10) Patent No.: US 12,411,833 B1
(45) Date of Patent: Sep. 9, 2025

(54) SYSTEM FOR AUTOMATED ESTATE DOCUMENT GENERATION AND UPDATING TO ENABLE TRUSTEE, EXECUTOR, AND POWER OF ATTORNEY SERVICES FOR CHILDFREE PEOPLE

(71) Applicant: Jay Zigmont, Mount Juliet, TN (US)

(72) Inventor: Jay Zigmont, Mount Juliet, TN (US)

( * ) Notice: Subject to any disclaimer, the term of this patent is extended or adjusted under 35 U.S.C. 154(b) by 0 days.

(21) Appl. No.: 18/916,943

(22) Filed: Oct. 16, 2024

(51) Int. Cl.
*G06F 16/23* (2019.01)
*G06F 40/166* (2020.01)
*G06Q 50/18* (2012.01)

(52) U.S. Cl.
CPC ............ *G06F 16/23* (2019.01); *G06F 40/166* (2020.01); *G06Q 50/186* (2013.01)

(58) Field of Classification Search
CPC ...... G06F 16/23; G06F 40/166; G06Q 50/186
See application file for complete search history.

(56) References Cited

U.S. PATENT DOCUMENTS

2018/0315143 A1* 11/2018 Rang .................. G06N 5/04

\* cited by examiner

*Primary Examiner* — Truong V Vo

(57) ABSTRACT

A method may include receiving a first set of information relating to a childfree individual; generating a digital document based on the first set of information; storing the digital document in a database; periodically communicating a notification to a device of the childfree individual; receiving a second set of information in response to the notification; modifying the digital document based on the second set of information; and updating the database with an updated digital document. In this way, the method enables trustee, executor, and power of attorney services for childfree people regardless of location.

20 Claims, 4 Drawing Sheets

SYSTEM FOR AUTOMATED ESTATE DOCUMENT GENERATION AND UPDATING TO ENABLE TRUSTEE, EXECUTOR, AND POWER OF ATTORNEY SERVICES FOR CHILDFREE PEOPLE

TECHNICAL FIELD

The embodiments generally relate to systems and methods for computer-automated document generation and updating.

BACKGROUND

Conventional systems for life, financial, and estate planning document generation may include creating a document, such as a will, trust, etc., for handling a person's estate which is rarely updated after creation.

In an emergency, most U.S. States look for next-of-kin to determine how to manage a person's estate. Approximately 20-25% of the US are childfree or permanently childless (approximately 50-60 million people). As used herein, "childfree individual," and variations of that phrase, refers to a person who does not have or does not plan to have children. Childfree people may have difficulty finding someone to fill the role of executor, trustee, and power of attorney (POA) in estate planning and documents. When there is no one specified, the government or healthcare organizations will have to decide who may act as executor, trustee, or power of attorney. In some cases, the government may appoint a guardian for long-term decision-making, such as when someone needs to be put into long-term care.

Some states, allow appointing a professional fiduciary to make medical and financial decisions. Estate attorneys are often willing to serve as executors and/or financial POAs, but not medical POAs. Trust companies can serve in all three roles, but only in rare cases, and many require high asset value.

Childfree people have different life, financial, and estate plans than parents. Childfree people may have more time, money, and freedom than parents. The result is that childfree people move frequently or live a completely nomadic life. Their plans, location, and needs change regularly, adding challenges to serving them as trustee, POA and executor.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

The disclosed system, product, or method may include the steps of receiving a first set of information relating to a childfree individual; generating a digital document based on the first set of information; storing the digital document in a database; periodically communicating a notification to a device of the childfree individual; receiving a second set of information in response to the notification; modifying the digital document based on the second set of information; and updating the database with an updated digital document. In this way, the present invention provides a system, product, or method of providing executor, trust, or POA services regardless of geographic location of a user, and, in some embodiments, provides for automated updating of will, trust, or POA services.

In one aspect, the present invention may include a document module configured to create life and estate planning documents for a user, a notification module configured to communicate messages such as SMS, and a modification module configured for modifying life and estate planning documents periodically based on user input.

In one aspect, a document module is configured for generating life planning documents, for example, from a template, including user information input by a user into the system. The module may, for example, input user information into a document template based on a category of information. That is, the system may include a document template that may require user input regarding the user's name or age, assets, and naming their power of attorney, trustees, executors, etc. The system may map the user input to categorized fields in a document. For example, user input into a "name" field of a graphical user interface may be mapped to a "name" field of a document. The generated documents may be stored in a database, such as a blockchain ledger, and may be accessible, for example, by the trustee and to provide emergency POA services.

In one aspect, a notification module may be configured to routinely communicate notifications to a device, e.g. a smartphone, requiring user input of updated information. For example, on a regular basis, the notification module may communicate a push notification to a user device requiring input via a graphical user interface (UI) displayed on a display of the user device. In this way, the system may communicate notifications over a network and receive user input.

In one aspect, a modification module may be configured to modify the categorized fields of a document based on user input received via the notification module in response to a notification. For example, in response to receiving user input of a "trustee" field of a graphical user interface for the first time, the modification module may map the user input to a "trustee" field of a generated document. In response to receiving a second notification from the notification module, the user input may include new user input for the "trustee" field, and the modification module may update the data in the "trustee" field of the generated document, thereby producing an updated generated document. The system may map the new user input to categorized fields in a document and replace information in the generated document with the new user input. The updated generated document may be stored in a database, such as a blockchain ledger, and may be accessible, for example, by a trustee. In this way, the system provides a means for generating and updating documents routinely regardless of the user's location.

In some aspects, the system includes at least one computing device in operable communication with a network and a computing device in operable communication with the user network to host an application program for receiving a first set of information relating to a childfree individual; generating a digital document based on the first set of information; storing the digital document in a database; periodically communicating a notification to a device of the childfree individual; receiving a second set of information in response to the notification; modifying the digital document based on the second set of information; and updating the database with an updated digital document.

In embodiments, the system is configured to enable emergency response in situations such as medical emergency. When a childfree individual is incapacitated, healthcare organizations (or similar) will be able to use the system to receive a copy of the individual's medical POA, medical history, and associated information. At the same time, the system will notify the childfree individual that their information was accessed and notify their POA to review the information and contact the relevant emergency services.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
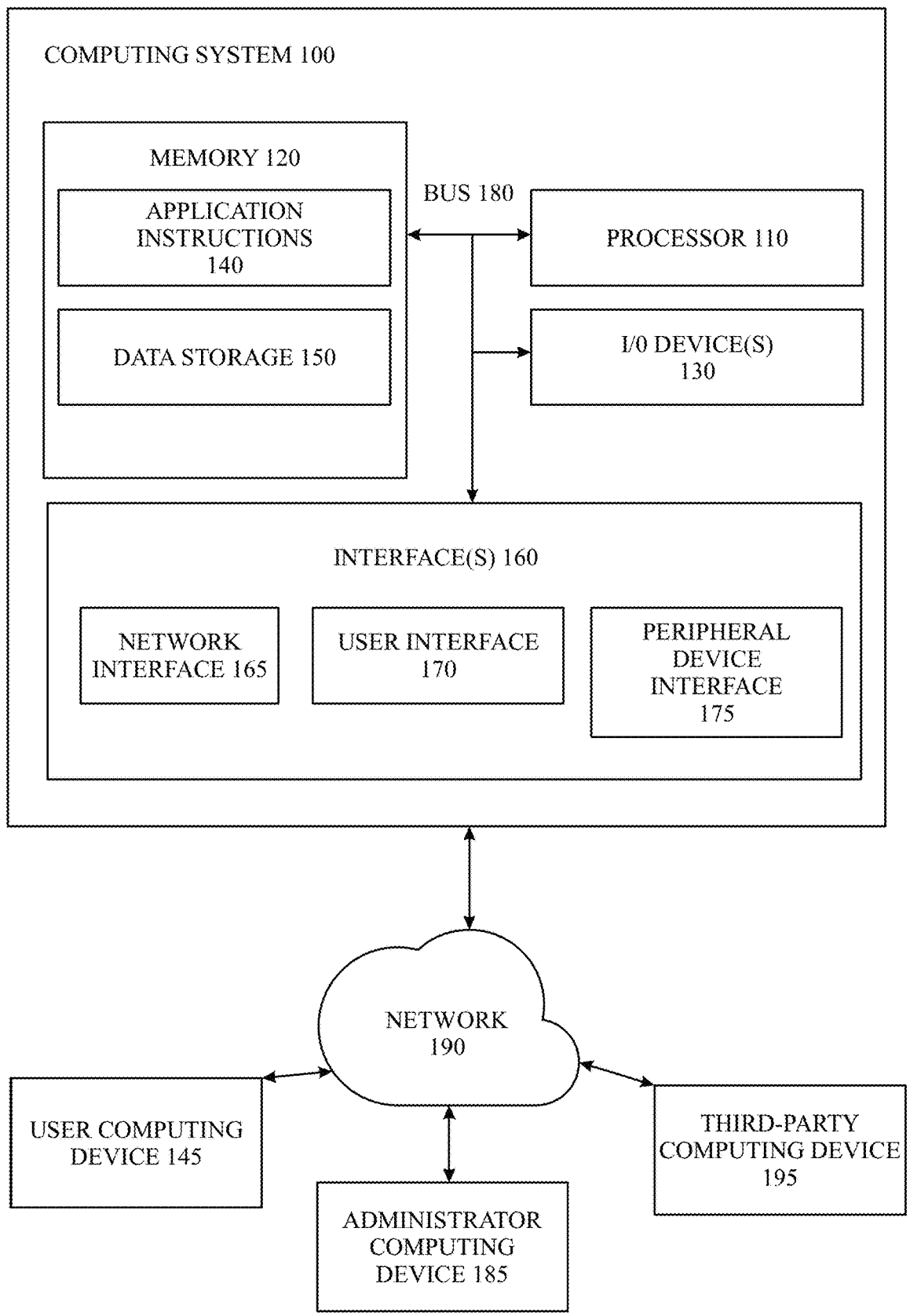
FIG. 1 illustrates a system architecture diagram, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed system may include a document module configured to create life and estate planning documents for a user, such as wills, trusts, power of attorney documents, estate plans, etc. A notification module may be configured to communicate messages such as SMS between the system and a user device. A modification module is configured for modifying life and estate planning documents periodically based on user input. In embodiments, the disclosed system is accessible by a trustee or similar third-party responsible as a decision-maker. In embodiments, an emergency may occur and a managing institution may receive notice of the incapacitation. In response to the notice, the system may automatically communicate relevant documents stored in the database to the relevant parties. A notification may be communicated to the user's device indicating that their electronic documents have been distributed.

In embodiments, the disclosed system functions as a real-time data source for estate documents and a trust system for childfree individuals needing a third party acting as an executor, trustee, medical power of attorney (POA), financial POA, or the like. In embodiments, the disclosed system may be an online software platform or application conducting an initial ingestion of user information relating to life, financial, and estate planning. Based on user input, documents may be generated, such as wills, trusts, medical POAs, financial POAs, or HIPAA waivers. In embodiments, documents may be generated based on the state, county, or city of the childfree individual. The online platform may be configured for the electronic execution of the generated documents, including the naming of an executor, trustee, or POA.

According to embodiments, the present invention is configured to update generated documents in real-time to ensure a user's will, trust, medical POA, financial POA, HIPAA waiver, etc., are up to date regardless of the user's geographic location. In embodiments, documents may be updated when a childfree individual changes states, residency, or citizenship based on the state, county, or city of the childfree individual. In embodiments, the present invention is configured to bill the trustee, executor, and POA services through annual fees, hourly charges, and administrative fees on all assets held in a trust. In this way, the user can be served for a limited period of time, or in an ongoing period of time in their trust, all billed by the services needed.

In practice and in use, the method may include a user subscribing to the method and inputting life, financial, medical, and estate history or goals. Based on the input, the method generates user-specific documents to achieve the user's goals (e.g., a living will may be generated specific to a user desirous of a living will). In some embodiments, additional documentation may be generated (e.g., "In Case I Die" files or medical histories to be referenced in an emergency). The system may communicate the documents over a network to a user's device and prompt the user to provide an electronic signature. Signed documents may be stored in a database, such as a cloud environment. In embodiments, the method may communicate periodic notifications to the user's device, prompting the user to update their information or confirm that no update is required. In response to the periodic notifications, new documents may be generated, electronically signed, and stored in a database. In embodiments, an emergency may occur, e.g., the user becomes incapacitated. A managing institution may receive notice of the incapacitation and, in response to the notice, automatically communicate relevant documents stored in the database to the relevant parties. A notification may be communicated to the user's device indicating that their electronic documents have been distributed. In this way, a managing institution may facilitate the management of a childfree user's life, financial, medical, and estate history or goals.

In practice and in use, the system may be utilized in cases where a childfree user is in need of an executor of their will or trust but has no relatives or persons willing to act as executors, trustees, or POAs. As an example, a user may interact with the disclosed system via a UI on a device, such as a smartphone. The user may input a first set of information relating to their life, finances, medical history, and estate wines. In response to user input, a trust document and a will document may be generated based on document templates. In embodiments, additional documents may be generated, such as POAs and waivers, including mapping the first set of information to relevant fields in a generated document. The system may communicate a prompt to the user device to require the user to electronically execute any documents. Periodically, on a predetermined schedule, a user-defined schedule, or a third-party-defined schedule, the system may communicate a notification to the user device requiring the user to provide updated information in a second set of information. The periodic communication may be, without limitation, daily, weekly, monthly, etc. The notification may, for example, include a hyperlink to a software application or web portal, including a user interface configured to receive the second set of information. In embodiments, the system is configured to allow a user to update documents with the second set of information at any time. The system may modify the digital document based on the second set of information and update a database with the updated digital document.

In this way, the system provides for real-time updating of documents based on periodically requiring updates to user information. In some embodiments, when a user becomes incapacitated, the system may include communicating updated digital documents to relevant parties, including executors and trustees. In embodiments, the system may also communicate a notification to the user device when a document is distributed to a third-party.

Implementations of the invention involve the technical field of automated document generation and updating including the steps of generating a digital document based on a first set of information; storing the digital document in a database; periodically communicating a notification to a device of the childfree individual; receiving a second set of information in response to the notification; modifying the digital document based on the second set of information; and updating the database with an updated digital document, and are therefore necessarily rooted in computer technology. For example, the steps of generating a digital document based on the first set of information; storing the digital document in a database; periodically communicating a notification to a device of the childfree individual; updating the database with an updated digital document; and allowing computer-based access to documents in real-time are computer-based and cannot be performed in the human mind. The present invention amounts to more than merely implementing the generic computer as a tool to gather, analyze, and output data because the steps of the present method, system, or product improve the speed at which digital documents may be generated and updated regardless of a user's geographic location. Additionally, the steps of the present invention would be impossible to accomplish on pen and paper due to the volume of data being communicated and received over a network in real-time. In particular, the speed at which the steps of the present invention occur to effectuate the disclosed method, system, or product would involve large-scale, continuous wireless communication of such data over a network. That is, the steps of the present method, system, or product are impossible to accomplish on pen and paper, cannot be accomplished as a method of organizing human activity, and amount to significantly more than merely gathering, analyzing, and outputting data.

To the extent that the disclosed system, method, and software product collect, store, communicate, or utilize personally identifiable information (PII), medical information, or any other information considered confidential or personally identifiable, implementations of the invention meet compliance requirements of SEC regulations, AML/KYC, SOC 2, and HIPAA, when appropriate, and include notifying the relevant party any time PII is shared with or communicated to a third party.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computer system 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In embodiments, the computer system 100 and network interface 165, and steps performed by the same, comply with SEC regulations, AML/KYC, SOC 2, and HIPAA. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized a user (e.g., a healthcare provider) to interact with the various functionalities of the system including to perform patient rounds, handoff patient rounding responsibility, perform biometric verification tasks, and other associated tasks and functionalities of the system. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
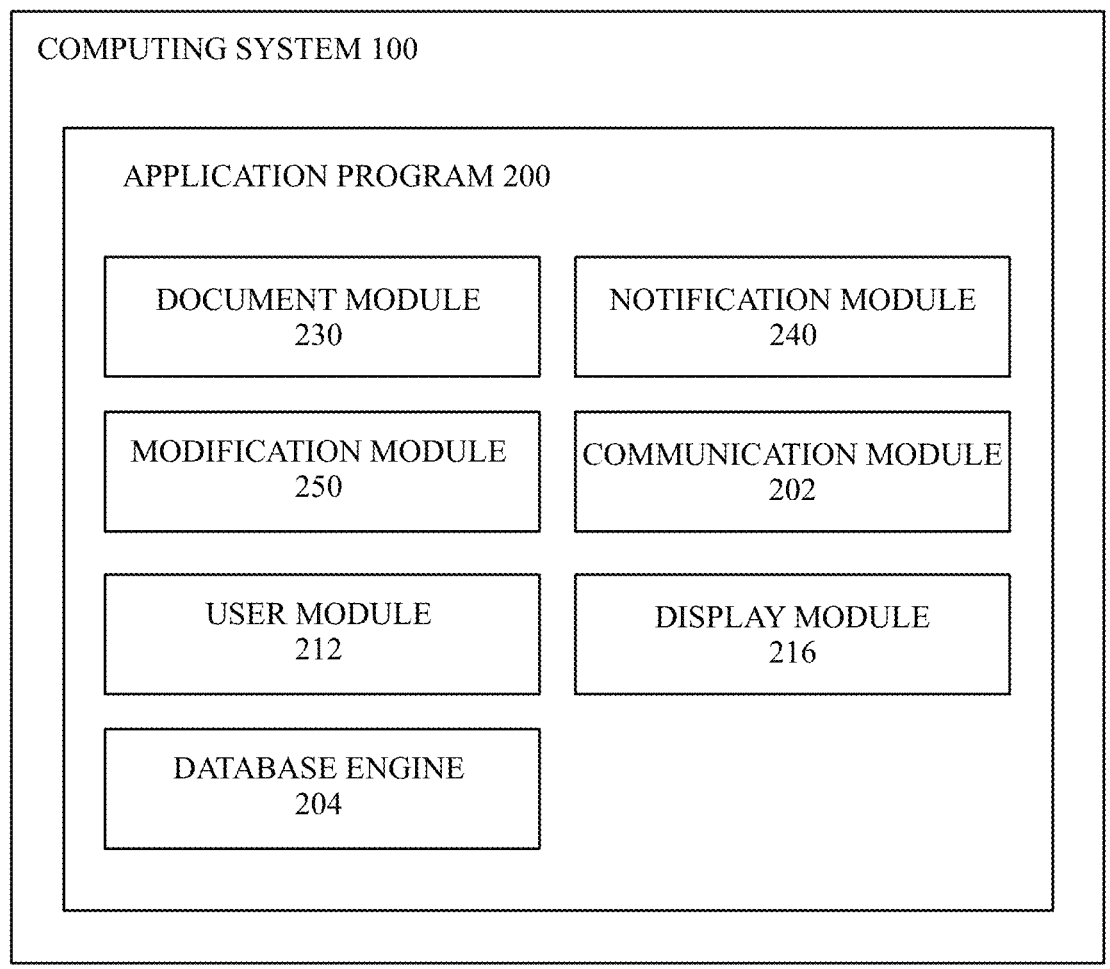
FIG. 2 illustrates an application program and modules in communication with the computing system, according to some embodiments.

FIG. 2 illustrates an example computer architecture for the application program 200 operated via the computing system 100. The computer system 100 comprises several modules and engines configured to execute the functionalities of the application program 200, and a database engine 204 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more modules including a document module 230, a notification module 240, and a modification module 250 corresponding to the application instructions 140 of FIG. 1.

The document module 230 may be configured to receive a first set of information relating to a childfree individual via, for example, receiving user input via a software application or web-portal configured to receive user input and communicate the user input to the computing system 100 of FIGS. 1 and 2. In some embodiments, the document module 230 is configured for generating life planning documents including the user information input by a user into the system. Generating a document may include identifying a document template matching the purpose or function of the document to be generated, wherein the document includes placeholder fields where user input may be matched via autofill based on user input. The system may map the user input to categorized fields in a document. For example, user input into a "name" field of a graphical user interface may be mapped to a "name" field of a document. The document module 230 may, for example, input user information into a document template based on a category of information associated with the user input and a placeholder field. The generated documents may be stored in a database, such as a blockchain ledger, and may be accessible, for example, by a trustee. In this way, the document module 230 may generate a digital document based on a first set of information and store the digital document in a database.

In embodiments, the document module 230 may be configured to receive a second set of information in response to the notification, similar to how the document module 230 receives the first set of information. In some embodiments, the second set of information may be an updated version of the first set of information. In some embodiments, the second set of information includes user input, including a confirmation that the first set of information does not need to be updated.

In embodiments, the document module 230 may also communicate the digital document and the updated digital document to the device of the childfree individual, receive an electronic signature on the digital document and the updated digital document, and update the database with a signed digital document and a signed updated digital document.

The notification module 240 may be configured to routinely communicate notifications to a device, e.g. a smartphone, requiring user input of updated information. For example, on a three-month basis, the notification module 240 may communicate a push notification to a user device requiring input via a graphical user interface (UI) displayed on a display of the user device. In this way, the system may periodically communicate a notification to a device of the childfree individual.

In embodiments, the notification module 240 may also be configured to communicate the updated digital document to an emergency service provider's device (e.g., a hospital computer system) and communicate a distribution notification to the device of the childfree individual indicating that the updated digital document was communicated to an emergency service provider's device.

The modification module 250 may be configured to modify the categorized fields of a document based on the second set of information received via the notification module 240 in response to a notification. For example, in response to receiving user input of a "trustee" field of a graphical user interface for the first time, the modification module 250 may map the user input to a "trustee" field of a generated document. In response to receiving a second notification from the notification module, the user input may include new user input for the "trustee" field, and the modification module 250 may update the data in the "trustee" field of the generated document, thereby producing an updated generated document. The system may map the new user input in the second set of information to categorized fields in a document and replace information in the generated document with the new user input. The updated generated document may be stored in a database, such as a blockchain ledger, and may be accessible, for example, by a trustee. In this way, the system provides a means for generating and updating documents routinely regardless of the user's location.

In some embodiments, the communication module 202 is configured for receiving, processing, and transmitting a user command and/or one or more data streams. In such embodiments, the communication module 202 performs communication functions between various devices, including the user computing device 145 of FIG. 1, the administrator computing device 185 of FIG. 1, and a third-party computing device 195 of FIG. 1. In some embodiments, the communication module 302 is configured to allow one or more users of the system, including a third-party, to communicate with one another. In some embodiments, the communications module 202 is configured to maintain one or more communication sessions with one or more servers, the administrative computing device 185 of FIG. 1, and/or one or more third-party computing device(s) 195 of FIG. 1. In some embodiments, the communication module 202 may allow users and administrators to communicate with one another.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

The user module 212 may store user preferences including the user account information, historical usage data, user personal information, and the like. The user module 212 may facilitate the creation of user profiles for users, administrators, and others.

In some embodiments, the display module 216 is configured to display one or more graphic user interfaces, including, e.g., one or more user interfaces. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various information generated and displayed in a display module 216 may not be persistently stored. The display module 216 displays information, notifications, and alerts to the user's device, which can be viewed and acknowledged by the user.

Figure 3:
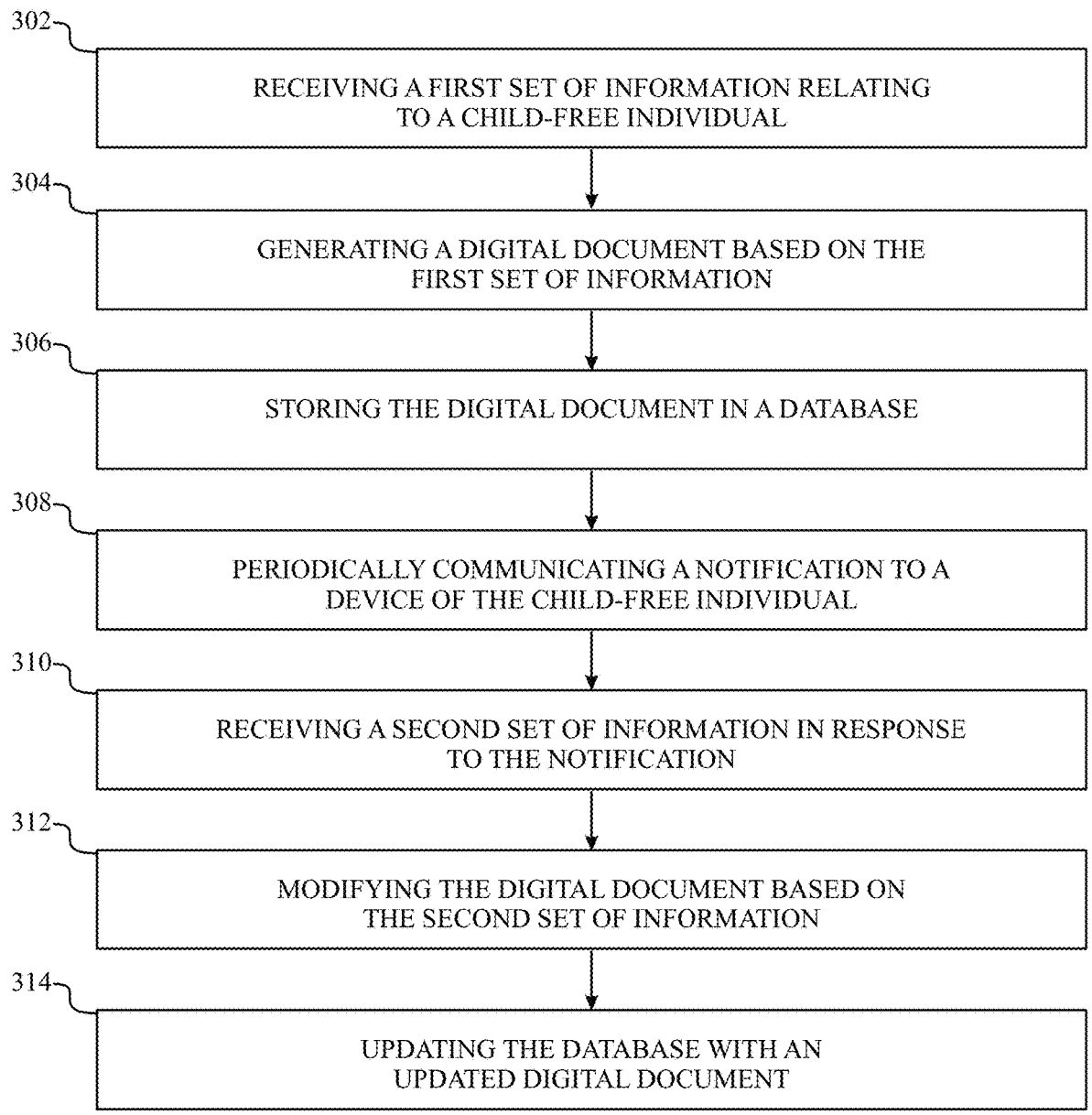
FIG. 3 illustrates a method for automatically generating and updating life planning documents, according to some embodiments.

FIG. 3 illustrates a method for automated document generation and updating. According to step 302, the system may receive the first set of information relating to a childfree individual via document module 230 of FIG. 2. In step 304, the system may generate a digital document based on the first set of information via the document module 230 of FIG. 2. In step 306, the system may store the digital document in a database via the document module 230 of FIG. 2. In step 308, the system may periodically communicate a notification to a device of the childfree individual via the notification module 240 of FIG. 2. In step 310, the system may receive a second set of information in response to the notification via the document module 230 of FIG. 2. In step 312, the system may modify the digital document based on the second set of information via the modification module 250 of FIG. 2. In step 314, the system may update the database with an updated digital document via the modification module 250 of FIG. 2.

Figure 4:
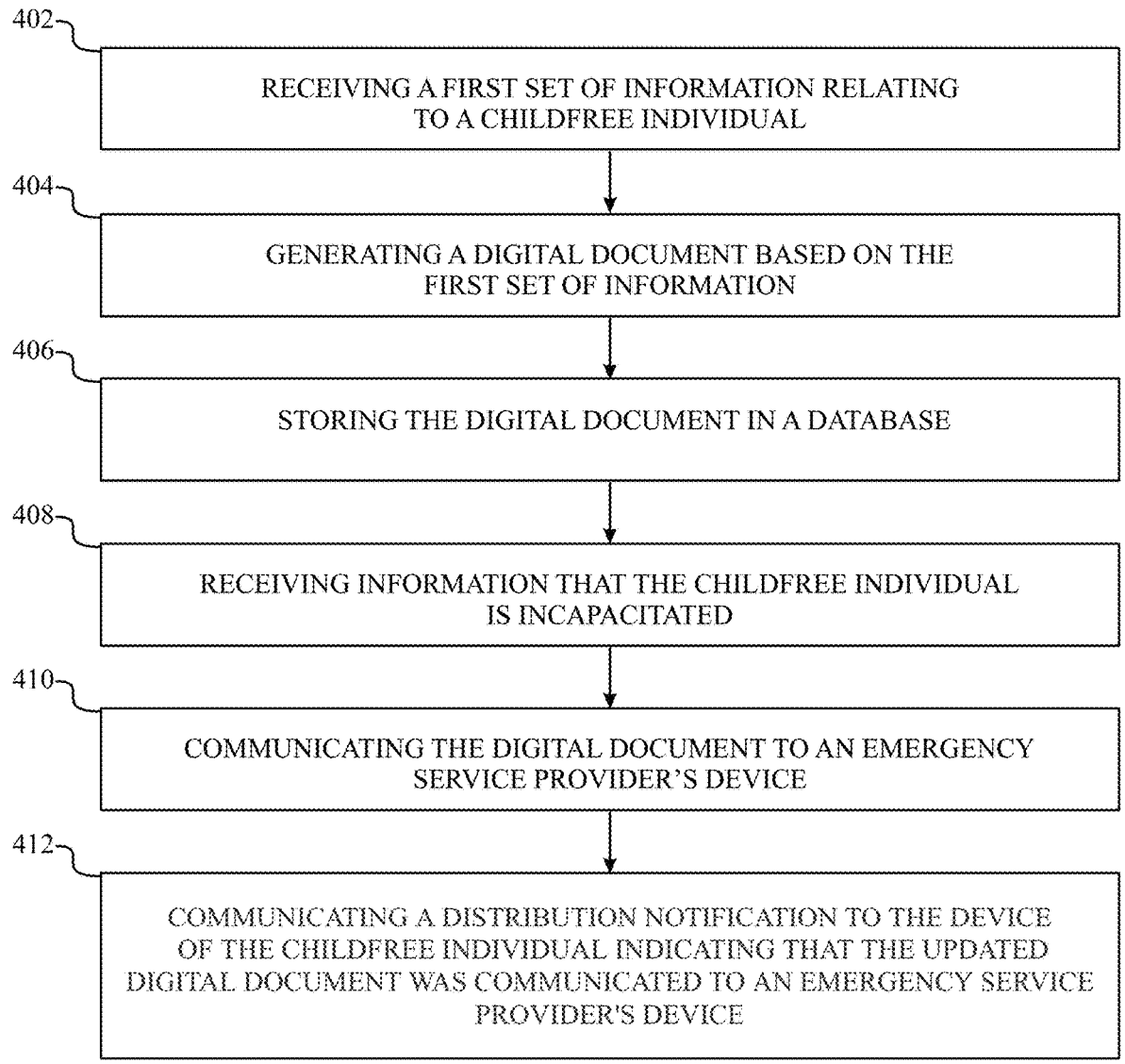
FIG. 4 illustrates a method for automatically communicating life planning documents with emergency service providers, according to some embodiments.

FIG. 4 illustrates a method for automated document generation and updating. According to step 402, the system may receive the first set of information relating to a childfree individual via document module 230 of FIG. 2. In step 3404, the system may generate a digital document based on the first set of information via the document module 230 of FIG. 2. In step 406, the system may store the digital document in a database via the document module 230 of FIG. 2. In step 408, the system may receive information that the childfree individual is incapacitated via the communication module 202 of FIG. 2. In step 410, the system may communicate the digital document to an emergency service provider's device via the communication module 202 of FIG. 2. In step 412, the system may communicate a distribution notification to the device of the childfree indicating that the updated digital document was communicated to an emergency service provider's device via the communication module 202 of FIG. 2.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

What is claimed is:

1. A computer-implemented method comprising:
   receiving, via a computing device, a first set of information relating to a childfree individual;
   generating, via the computing device, one or more digital documents based on the first set of information, the digital documents including personalized user interface elements and interactive controls that are rendered according to pre-defined templates stored in memory, wherein the generation further comprises dynamically adjusting the pre-defined templates in real time based on updated configuration parameters received from the individual;
   storing, via the computing device, the one or more digital documents in a database that incorporates version control and access logs to track document changes;
   periodically communicating, via the computing device, a notification to a device of the childfree individual, the notification comprising a secure access token and an instruction to review the digital documents;
   receiving, via the computing device, a second set of information in response to the notification;
   modifying, via the computing device, the one or more digital documents based on the second set of information, the modification step including recalculating dynamic content fields and updating configuration parameters in real time; and
   updating, via the computing device, the database with an updated one or more digital documents, the updating step further comprising comparing the updated digital documents to previous versions to detect changes and logging modifications for audit purposes.

2. The computer-implemented method of claim 1, wherein the one or more digital documents is related to estate planning services and incorporates dynamically updated estate planning parameters, and the one or more digital documents enables a third-party to act as trustee and provide trustee services with respect to a childfree individual.

3. The computer-implemented method of claim 1, wherein the one or more digital documents is related to power of attorney services, and wherein the generation of the digital documents incorporates real-time adjustment of user interface templates based on secure input parameters, and the one or more digital documents enables a third-party to act as power of attorney and provide power of attorney services with respect to a childfree individual.

4. The computer-implemented method of claim 1, wherein the one or more digital documents is related to executor services and wherein the updating step comprises an automated comparison of current and prior versions with time-stamped audit logging to facilitate executor actions.

5. The computer-implemented method of claim 1, wherein the one or more digital documents is related to trustee, power of attorney, or executor services, and the one or more digital documents are dynamically modified in real time to enable a third-party to make decisions on behalf of a childfree individual.

6. The computer-implemented method of claim 1, wherein the first set of information comprises life, estate planning, and medical information relating to the childfree individual.

7. The computer-implemented method of claim 1, wherein the periodically communicating occurs at least once every three months, wherein the frequency is dynamically adjustable based on user status and risk assessment.

8. The computer-implemented method of claim 1, wherein the receiving the second set of information in response to the notification comprises user input comprising a confirmation that the first set of information does not need to be updated.

9. The computer-implemented method of claim 1, wherein the one or more digital documents enables a third-party to make decisions on behalf of the childfree individual.

10. The computer-implemented method of claim 1, further comprising:
   receiving information that the childfree individual is incapacitated;
   communicating the updated one or more digital documents to an emergency service provider, power of attorney, trustee, or executor's device; and
   communicating a distribution notification to the device of the childfree individual indicating that the updated one or more digital documents was communicated to an emergency service provider's device.

11. The computer-implemented method of claim 1, further comprising:
   communicating the one or more digital documents and the updated one or more digital documents to the device of the childfree individual;
   receiving an electronic signature on the one or more digital documents and the updated one or more digital documents; and
   updating the database with a signed one or more digital documents and a signed updated one or more digital documents.

12. A system comprising:
   at least one computing device in operable communication with a network;
   a computing device in operable communication with the network, the computing device configured to host an application program configured to:
   receive a first set of information relating to a childfree individual;
   generate a one or more digital documents based on the first set of information, the digital documents including personalized user interface elements and interactive controls that are rendered according to pre-defined templates stored in memory, wherein the generation further comprises dynamically adjusting the pre-defined templates in real time based on updated configuration parameters received from the individual;
   store the one or more digital documents in a database that incorporates version control and access logs to track document changes;
   periodically communicate a notification from the at least one computing device to a device of the childfree individual, the notification comprising a secure access token and an instruction to review the digital documents; and
   receive a second set of information in response to the notification.

13. The system of claim 12, wherein the application program is further configured to:
   modify the one or more digital documents based on the second set of information; and
   update the database with an updated one or more digital documents.

14. The system of claim 13, wherein the second set of information comprises user input indicating that the first set of information does not require updating; and wherein the application program is further configured to mark the one or more digital documents as user reviewed.

15. The system of claim 14, wherein the application program is further configured to:
   receive information that the childfree individual is incapacitated;
   communicate the updated one or more digital documents to an emergency service provider's device; and
   communicate a distribution notification to the device of the childfree individual indicating that the updated one or more digital documents was communicated to an emergency service provider's device.

16. The system of claim 15, wherein the application program is further configured to:
   communicate the one or more digital documents and an updated one or more digital documents device of the childfree individual;
   receive an electronic signature on the one or more digital documents and the updated one or more digital documents; and
   update the database with an electronically signed one or more digital documents and an electronically signed updated one or more digital documents.

17. The system of claim 12, wherein the one or more digital documents is related to estate planning services, power of attorney services, executor services, and trustee services.

18. The system of claim 12, wherein the first set of information comprises life, estate planning, and medical information relating to the childfree individual.

19. The system of claim 12, wherein the periodic communication occurs at a frequency determined by a third-party.

20. A software product comprising:
   at least one computing device in operable communication with a network and a database;
   a computing device in operable communication with the network, the computing device configured to host an application program configured to:
   receive a first set of information relating to a childfree individual;
   generate a one or more digital documents based on the first set of information, the digital documents including personalized user interface elements and interactive controls that are rendered according to pre-defined templates stored in memory, wherein the generation further comprises dynamically adjusting the pre-defined templates in real time based on updated configuration parameters received from the individual;
   store the one or more digital documents in the database that incorporates version control and access logs to track document changes;
   periodically communicate a notification from the at least one computing device to a device of the childfree individual, the notification comprising a secure access token and an instruction to review the digital documents;
   receive a second set of information in response to the notification;
   modify the one or more digital documents based on the second set of information, the modification step including recalculating dynamic content fields and updating configuration parameters in real time; and
   update the database with an updated one or more digital documents, the updating step further comprising comparing the updated digital documents to previous versions to detect changes and logging modifications for audit purposes.

* * * * *